United States Patent
Xhafa et al.

(10) Patent No.: US 7,782,822 B2
(45) Date of Patent: Aug. 24, 2010

(54) REDUCING COLLISIONS IN BEAMFORMING WIRELESS SYSTEMS

(75) Inventors: Ariton E. Xhafa, Plano, TX (US); Harshal S. Chhaya, Plano, TX (US); Shantanu Kangude, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 552 days.

(21) Appl. No.: 11/762,520

(22) Filed: Jun. 13, 2007

(65) Prior Publication Data

US 2008/0192707 A1    Aug. 14, 2008

Related U.S. Application Data

(60) Provisional application No. 60/804,624, filed on Jun. 13, 2006.

(51) Int. Cl.
*H04J 3/00* (2006.01)
(52) U.S. Cl. .................. 370/336; 370/328
(58) Field of Classification Search ........... 370/312, 370/316, 328, 336, 447
See application file for complete search history.

(56) References Cited

U.S. PATENT DOCUMENTS

| 7,103,386 B2 | 9/2006 | Hoffmann et al. |
| 2007/0002820 A1 | 1/2007 | Xhafa |
| 2007/0206519 A1* | 9/2007 | Hansen et al. ............ 370/310 |

FOREIGN PATENT DOCUMENTS

WO    03019798 A2    3/2003

* cited by examiner

*Primary Examiner*—Sam Bhattacharya
(74) *Attorney, Agent, or Firm*—Steven A. Shaw; W. James Brady; Frederick J. Telecky, Jr.

(57) ABSTRACT

A device comprising transceiver logic and control logic coupled to the transceiver logic. The control logic is adapted to use the transceiver logic to broadcast a signal comprising either a Request-to-Send (RTS) signal or a Clear-to-Send-to-Self (CTS2S) signal to a plurality of other devices. The signal is adapted to cause the plurality of other devices to refrain from transmitting data. After at least some of the plurality of other devices have received the signal, the transceiver logic transmits at least part of another signal using beamforming techniques.

19 Claims, 5 Drawing Sheets

REDUCING COLLISIONS IN BEAMFORMING WIRELESS SYSTEMS

CROSS-REFERENCE TO RELATED APPLICATION

This application claims priority to U.S. Provisional Application No. 60/804,624, filed Jun. 13, 2006 and incorporated herein by reference.

BACKGROUND

Wireless networks, such as Wireless Local Area Networks (WLANs), often comprise one or more access points (APs) and one or more stations (STAs). The APs and the STAs communicate with each other by sending and receiving transmissions via one or more channels. Some wireless networks implement a transmission and reception technique known as "beamforming." Beamforming is a signal processing technique used to control the directionality of, or sensitivity to, a radiation pattern. For example, when receiving a signal, an AP or STA implementing beamforming can increase its reception sensitivity in the direction of wanted signals and decrease its reception sensitivity in the direction of interference, noise and other unwanted signals. Similarly, when transmitting a signal, an AP or STA implementing beamforming can increase the power of transmission in the direction the signal is to be sent.

There are disadvantages associated with beamforming. For example, in a WLAN, if an AP transmits a signal to an STA (hereinafter STA1) using beamforming, another STA (hereinafter STA2) in that WLAN may not receive (or "hear") the beamformed transmission. Because this STA2 does not hear the beamformed transmission, it may assume the channel is idle and begin transmitting its own data, thereby resulting in data collisions with data being transferred between the AP and the STA1.

SUMMARY

Accordingly, there are disclosed herein various techniques for reducing or even eliminating data collisions caused by beamforming in wireless networks. An illustrative embodiment includes a device comprising transceiver logic and control logic coupled to the transceiver logic. The control logic is adapted to use the transceiver logic to broadcast a signal comprising either a Request-to-Send (RTS) signal or a Clear-to-Send-to-Self (CTS2S) signal to a plurality of other devices. The signal is adapted to cause the plurality of other devices to refrain from transmitting data. After at least some of the plurality of other devices have received the signal, the transceiver logic transmits at least part of another signal using beamforming techniques.

Another illustrative embodiment includes a device comprising transceiver logic and control logic coupled to the transceiver logic. The control logic is adapted to use the transceiver logic to transmit a Request-to-Send (RTS) signal to another device. The transceiver logic begins transmitting at least part of a data signal to the another device using beamforming techniques after the transceiver logic receives one of a Clear-to-Send (CTS) signal or a beamformed Clear-to-Send-to-Self (CTS2S) signal.

Yet another illustrative embodiment includes a device comprising transceiver logic and control logic coupled to the transceiver logic. The control logic is adapted to use the transceiver logic to broadcast Clear-to-Send-to-Self (CTS2S) signals to a plurality of other devices using beamforming techniques. The transceiver logic broadcasts another CTS2S signal or a Request-to-Send (RTS) signal to a different plurality of other devices. After transmitting either the another CTS2S signal or the RTS signal, the transceiver logic transmits data signals using beamforming techniques.

Still another illustrative embodiment includes a system comprising a primary network member and a plurality of secondary network members. The primary network member broadcasts a signal that is adapted to cause the plurality of secondary members to refrain from transmitting data. After at least some of the plurality of secondary network members have received the signal, the primary network member transmits at least part of a data signal using a long-range communication technique.

Still another illustrative embodiment includes a method that comprises, in a network comprising a primary member and multiple secondary members, broadcasting a signal from the primary member that causes some of the multiple secondary members to refrain from transmitting signals on the network. The method also comprises, after at least some of the multiple secondary members have received the signal, transmitting at least part of another signal from the primary member to one of the multiple secondary members using beamforming techniques.

Still another illustrative embodiment includes a method that comprises, in a network comprising a primary member and multiple secondary members, broadcasting a signal from one of the multiple secondary members that causes some of the multiple secondary members to refrain from transmitting signals on the network. The method also includes, after the some of the multiple secondary members have received the signal, transmitting at least part of another signal from the one of the multiple secondary members to the primary member using beamforming techniques.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical or wireless connection. Thus, if a first device couples to a second device, that connection may be through a direct electrical or wireless connection, or through an indirect electrical or wireless connection via other devices and connections. The term "connection" refers to any path via which a signal may pass. For example, the term "connection" includes, without limitation, wires, traces and other types of electrical conductors, optical devices, wireless pathways, etc. Further, the term "or" is meant to be interpreted in an inclusive sense rather than in an exclusive sense.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
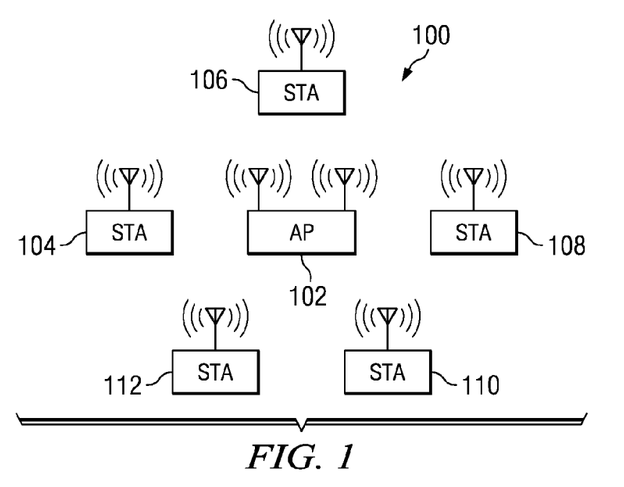
FIG. 1 shows an illustrative, wireless network implementing the disclosed techniques in accordance with various embodiments of the invention.

Disclosed herein are various techniques for reducing or even eliminating data collisions caused by beamforming in wireless networks. FIG. 1 shows an illustrative network 100 (e.g., a WLAN) comprising an access point (AP) 102 and multiple stations (STAs) 104, 106, 108, 110 and 112. The scope of this disclosure is not limited to any specific number of APs or STAs. Each of the STAs comprises any suitable wireless device, such as a personal computer (PC) or other mobile communication device. For example, in some embodiments, an AP 100 may comprise a wireless access point communicably coupled to an Internet Service Provider (ISP) and the STAs may comprise laptop or notebook computers communicably coupled to the AP 100. Each of the STAs may transmit data to and receive data from the AP 102.

Figure 2:
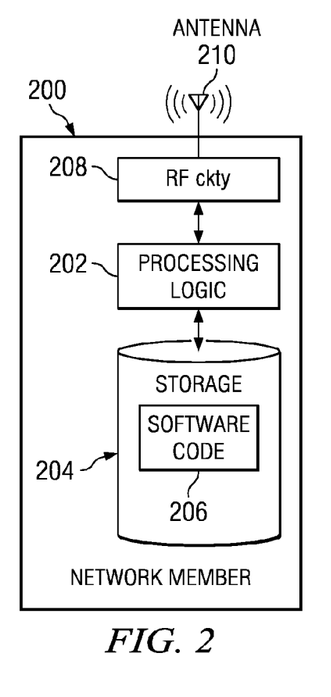
FIG. 2 shows a block diagram of the contents of at least some members of the wireless network of FIG. 1, in accordance with various embodiments of the invention.

Each of the AP 102 and the STAs 104, 106, 108, 110 and 112 may be referred to as a "network member." FIG. 2 shows an illustrative block diagram of a network member 200. Each network member 200 comprises a processing logic 202, a storage 204 comprising software code 206, radio frequency (RF) circuitry (or "transceiver logic") 208 and an antenna 210. When executed by the processing logic 202, the software code 206 causes the processing logic 202 to perform at least some of the various techniques disclosed herein.

Referring again to FIG. 1, each of the network members in the network 100 is able to transmit and receive data using beamforming techniques. For example, the AP 102 may transmit a signal to the STA 108 using beamforming techniques. In such a case, the AP 102 broadcasts the signal to all of the STAs, but increases transmission power in the direction of the STA 108. Similarly, the AP 102 may use beamforming techniques to receive one or more signals. For example, the AP 102 may use beamforming techniques to increase reception sensitivity in the direction of the STA 108 and to decrease (or leave the same) the reception sensitivity in the direction of the STAs 104, 106, 110 and 112. Beamforming is described in detail in co-pending, commonly-assigned United States Patent Application Nos. 20070002820 and 20050213686, both of which are incorporated herein by reference.

Figure 3A:
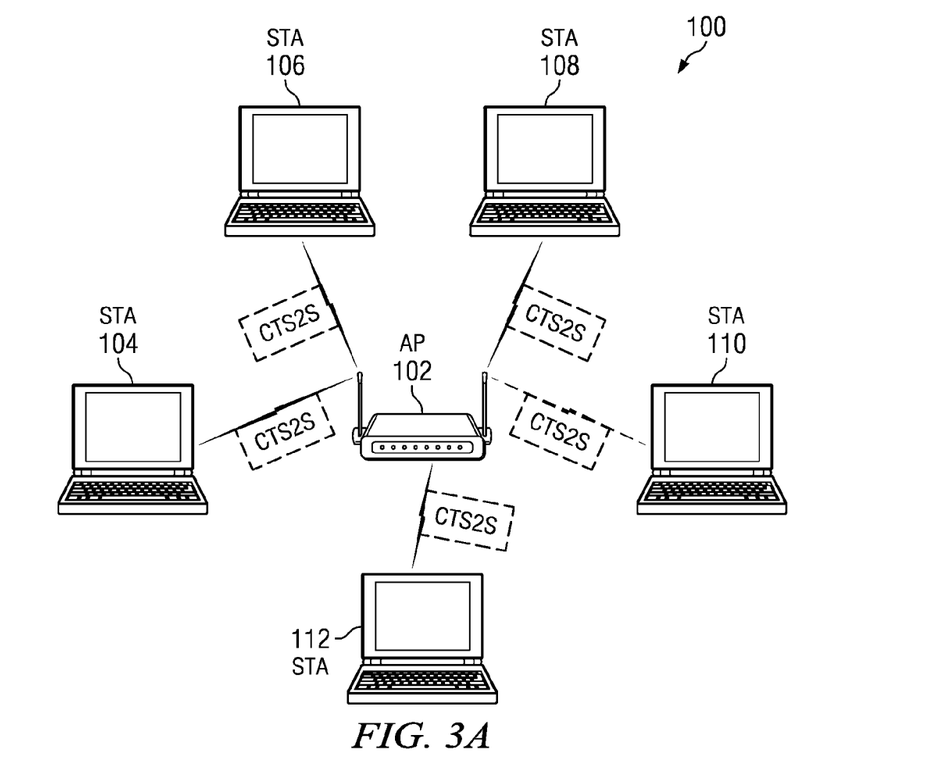
FIG. 3a shows another illustrative, wireless network implementing the disclosed techniques in accordance with various embodiments of the invention.

As previously explained, beamforming is often associated with undesirable data collisions on a wireless network. FIG. 3a shows an illustrative technique by which such data collisions caused by beamforming are reduced or even eliminated. FIG. 3a shows the network 100 comprising the AP 102 and STAs 104, 106, 108, 110 and 112. In accordance with various embodiments, prior to transmitting a signal to a target STA using beamforming techniques, the AP 102 ensures that no other STAs are transmitting data, and further ensures that none of the STAs will be transmitting data during the beamformed transmission. Accordingly, the AP 102 transmits a Clear-to-Send-to-Self (CTS2S) signal to the STAs in the network 100. The CTS2S signal is a variation of the Clear-to-Send (CTS) signal, which comprises a signal sent by one network member to a second network member in response to a Request-to-Send (RTS) signal received from the second network member. In at least some embodiments, unlike a CTS signal, the CTS2S signal is not sent in response to receipt of another signal. Further, unlike the CTS signal, the CTS2S signal is not transmitted to a specific STA but instead comprises a destination address that corresponds to the AP 102 itself. Thus, when broadcast, the CTS2S signal is detected by the various STAs, thereby causing those STAs to at least temporarily refrain from transmitting on the network 100.

Specifically, the CTS2S signal, like a CTS signal, causes each network member that receives the signal to refrain from transmitting signals (i.e., to "stay quiet") for at least a predetermined amount of time. This predetermined amount of time is encoded in the CTS2S signal in the form of a network allocation vector (NAV). Thus, for example, the AP 102 may broadcast a CTS2S signal having a NAV associated with 200 microseconds. Accordingly, the STAs receiving the CTS2S signal may refrain from transmitting signals for at least 200 microseconds. Signals which achieve effects similar to the CTS2S may be used instead of a CTS2S signal.

In preferred embodiments, the AP 102 may program the NAV of the CTS2S signal with a predetermined amount of time that is determined using various information available to the AP 102. Such information may include, for example, the amount of data to be transmitted using beamforming techniques, the amount of time the receiving STA usually takes to provide an acknowledgement (ACK) signal in response to the beamformed signal, etc.

After the AP 102 has transmitted the CTS2S signal and the STAs in the network 100 have received the CTS2S signal, the AP 102 may begin transmitting the signal(s) using beamforming techniques. Because the STAs in the network 100 have been provided with the CTS2S signal (or an equivalent), the STAs at least temporarily refrain from transmitting signals on the network because the STAs determine that the network channel is occupied by the beamformed transmission(s). Accordingly, because the STAs at least temporarily refrain from transmitting signals during the time specified in the NAV, data collisions due to beamforming are reduced or even eliminated.

In some cases, one or more of the STAs may begin transmitting signals on the network 100 before the predetermined amount of time specified in the NAV has expired. This may occur because these STAs comprise a timeout mechanism which causes the STAs to override the time period designated in the NAV and to transmit signals after a predetermined timeout period has expired. For example, such an STA may receive a CTS2S signal from an AP with a NAV indicating that the STA should refrain from transmitting signals on the network until 300 microseconds have expired. However, the STA may have a timeout mechanism (i.e., a "CTS-timeout") with a timeout period of, for example, 100 microseconds. Accordingly, even though the NAV of the CTS2S signal indicates that the STA should not transmit signals on the network until 300 microseconds have expired, in some cases, the STA may override this request and may begin transmitting as soon as 100 microseconds have expired. Because the AP may still be transmitting beamformed signals after the STA's timeout period has expired, transmissions from the STA may collide with the AP's beamformed signals.

Figure 3B:
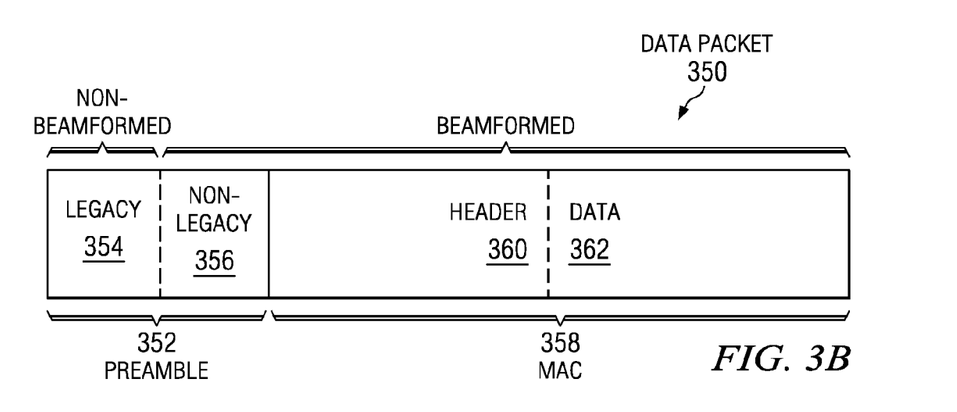
FIG. 3b shows an illustrative data packet in accordance with preferred embodiments of the invention.

Such a problem may be remedied by the AP sending some, but not all, of each data packet using beamforming techniques. FIG. 3b shows an illustrative data packet 350. The data packet 350 comprises a preamble 352 which, in turn, comprises a legacy portion 354 and a non-legacy portion 356. The legacy portion 354 is used so that legacy devices (e.g., those using 802.11a, 802.11b, 802.11g) may properly process the packet's preamble information. The non-legacy portion 356 is used for devices which implement the latest wireless communication protocol(s). The data packet 350 also comprises a Media Access Control (MAC) portion 358, which contains a header portion 360 (comprising various information associated with the packet) and a data (or "payload") portion 362. In accordance with preferred embodiments, each data packet 350 transmitted by the AP 102 using beamforming techniques is transmitted such that a portion of each data packet 350 is transmitted without using beamforming techniques and the remainder of the data packet 350 is transmitted using beamforming techniques. For example, in preferred embodiments, the legacy portion 354 of each data packet 350 is transmitted without using beamforming techniques, and the remainder of the packet 350—including the non-legacy portion 356 and the MAC 358—is transmitted using beamforming techniques. In this way, an STA having a timeout mechanism will not timeout and will not begin sending collision-bound data transmissions, because the STA repeatedly detects the non-beamformed portion of each data packet 350 sent by the AP.

Figure 4:
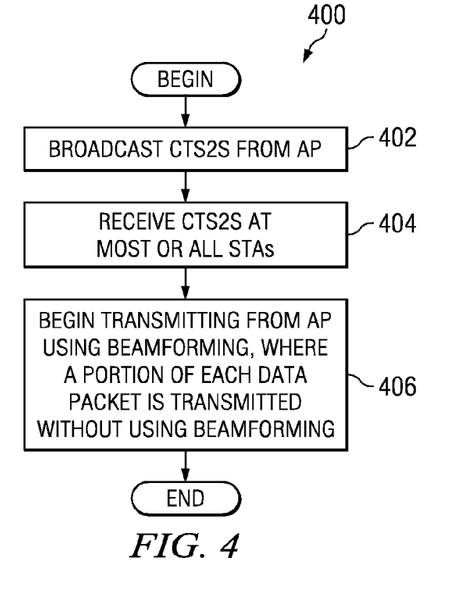
FIG. 4 shows a flow diagram of an illustrative method implemented in accordance with various embodiments of the invention.

For example, refer again to FIG. 3a and to FIG. 4, which shows an illustrative method 400 implementing embodiments of the invention. Assume that the AP 102 is to send a plurality of data packets to the STA 108 using beamforming techniques. Also assume that the STA 104 has data that is to be transmitted to the AP 102. In method 400, the AP 102 broadcasts a CTS2S signal or its equivalent (block 402). The method 400 continues with each STA in the network 100 receiving the CTS2S signal (block 404). The method 400 continues with the AP 102 transmitting a plurality of data packets using beamforming, with most or all data packet(s) having a portion that is not transmitted using beamforming (block 406). Because each STA in the network 100 repeatedly detects or "hears" the portion of each packet that is not transmitted using beamforming, these STAs will not transmit data on the network, even if the STAs' timeout periods expire.

Figure 5:
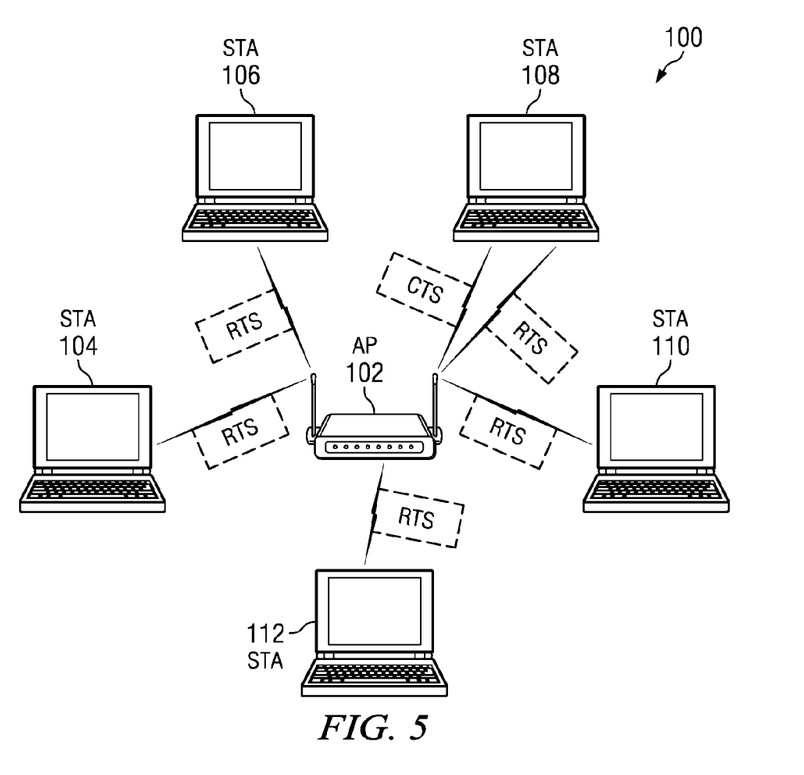
FIG. 5 shows yet another illustrative, wireless network implementing the disclosed techniques in accordance with various embodiments of the invention.
Figure 6:
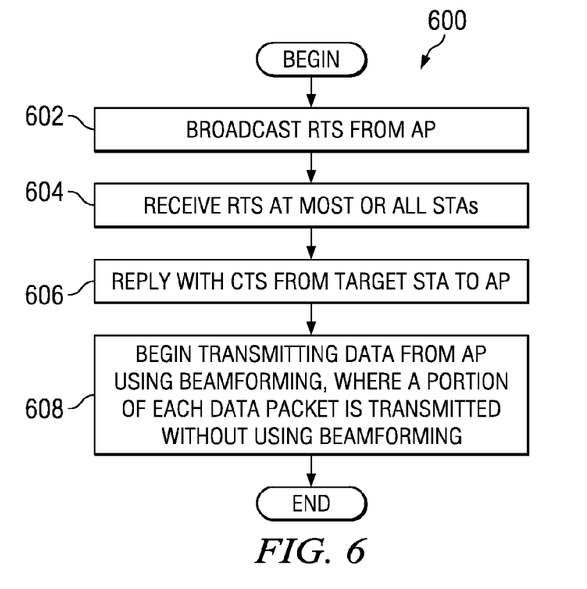
FIG. 6 shows a flow diagram of another illustrative method implemented in accordance with various embodiments of the invention.

FIGS. 5 and 6 are now used to describe another illustrative technique in accordance with various embodiments. As shown, the network 100 comprises the AP 102 and a plurality of STAs 104, 106, 108, 110 and 112. A method 600 in accordance with various embodiments begins by broadcasting an RTS signal (or its equivalent) from the AP 102 (block 602). The RTS signal broadcast by the AP 102 may include various header information, including an indicator designating the RTS signal for a specific STA (e.g., the STA 108). Preferably, the RTS signal comprises a NAV component (or its equivalent) which indicates to the STAs 104, 106, 110 and 112 that these STAs should refrain from transmitting data on the network 100 for some predetermined amount of time. The method 600 then comprises each of the STAs 104, 106, 108, 110 and 112 detecting (or "hearing") the RTS broadcast by the AP 102 (block 604). Because each of the STAs detects the RTS broadcast by the AP 102, the STAs refrain from broadcasting signals on the network 100 unless the RTS was designated for that STA. Thus, for example, if the RTS was designated for the STA 108, the STAs on the network 100 remain silent except for the STA 108, which transmits a CTS signal (or its equivalent) to the AP 102 (block 606). Preferably, the CTS signal includes a NAV component which indicates to other STAs that these other STAs should refrain from transmitting data on the network 100 for some predetermined amount of time. The CTS signal indicates to the AP 102 that the STA 108 is prepared to receive transmissions from the AP 102.

Accordingly, the AP 102 begins transmitting data to the STA 108 using beamforming techniques (block 608). As previously explained, to prevent data collisions resulting from expired timeout periods, a portion of some or all data packets transmitted from the AP 102 to the STA 108 may be transmitted without using beamforming. In this way, the STAs 104, 106, 110 and 112 repeatedly detect transmissions from the AP 102 and thus refrain from transmitting on the network 100, even if timeout periods of the STAs 104, 106, 110 and/or 112 have expired. The scope of this disclosure is not limited to the method 600 shown in FIG. 6. For example, instead of the AP 102 broadcasting the RTS and an STA responding with a CTS, in some embodiments, the STA may transmit the RTS and the AP 102 may respond with a CTS. All such variations are encompassed within the scope of this disclosure.

Figure 7A:
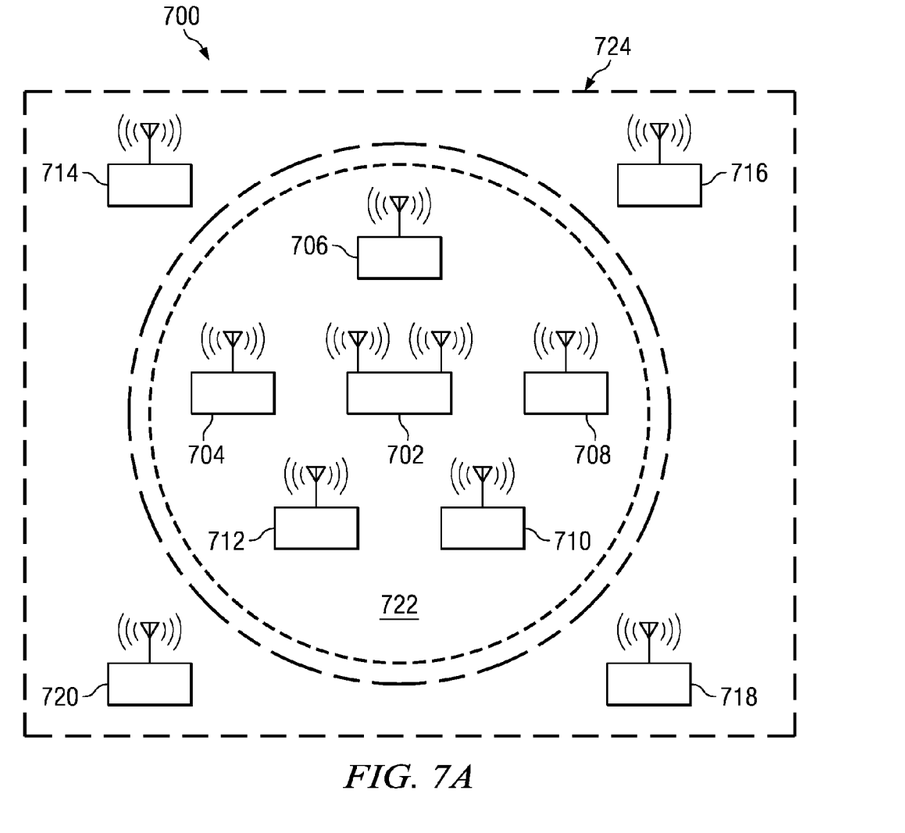
FIG. 7a shows yet another illustrative, wireless network implementing the disclosed techniques in accordance with various embodiments of the invention.

In some embodiments, beamforming may be used to extend the maximum transmission range of an AP. For example, an STA that the AP is unable to "reach" using non-beamformed transmissions may be reached using beamformed transmissions. FIG. 7a shows a network system 700 comprising an AP 702 and STAs 704, 706, 708, 710 and 712 which fall within an inner communications range 722. The AP 702 is adapted to communicate (e.g., using beamforming techniques) with additional STAs 714, 716, 718 and 720 which fall within an outer communications range 724. The boundary between ranges 722 and 724 is defined by the communications range of the AP 702. Specifically, the AP 702 is able to communicate with most or all STAs in the inner range 722 without having to use beamforming techniques. The AP 702 generally must communicate with the STAs in the outer range 724 using beamforming techniques or some other suitable long-range communication technique. Such long-range communication techniques include beamforming, space-time block coding (STBC), low-density parity codes (LDPC) techniques, and any other suitable technique by which multiple strata of communication devices may be formed (e.g., the multiple strata 722, 724 of FIG. 7a)—at least one stratum for devices which require long-range communication techniques to communicate with an AP or other device and at least one stratum for devices which do not require long-range communication techniques to communicate with an AP or other device.

Figure 7B:
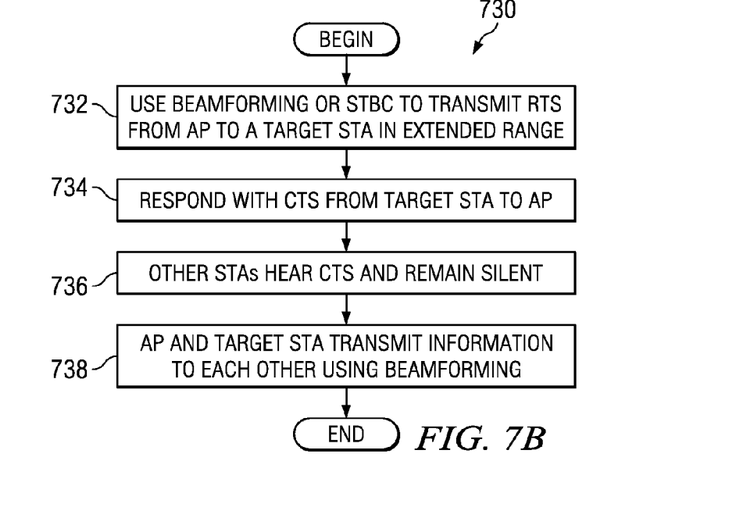
FIGS. 7b-7f show flow diagrams of additional methods implemented in accordance with various embodiments of the invention.

Various techniques may be implemented by members of the network 100 to prevent data collisions due to beamformed transmissions. At least some of these techniques are now described in turn. FIG. 7b shows an illustrative method 730 implemented in accordance with various embodiments. Referring to FIGS. 7a and 7b, the method 730 begins by using beamforming, STBC or another suitable long-range communication technique to transmit an RTS signal (or its equivalent) to a target STA in the outer range 724 (block 732). For example, the AP 702 may use beamforming to transmit an RTS signal to a target STA 716 in the outer range 724. The method 730 then comprises sending a CTS signal (or its equivalent) from the target STA to the AP (block 734). Continuing with the above example, the target STA 716 may transmit a CTS signal to the AP 702. The method 730 continues with other STAs (i.e., besides the STA 716) receiving (or "hearing") the CTS sent by the target STA and, as a result, refraining from transmitting data on the network 700 (block 736). For example, the target STA 716 may transmit the CTS signal and the other STAs 704, 706, 708, 710, 712, 714, 718 and 720 may receive the CTS signal, which causes these STAs to refrain from transmitting data on the network 700. The method 730 then comprises transmitting information from the AP to the target STA using beamforming or some other suitable, long-range communication technique. For example, the AP 702 may begin transmitting data to the target STA 716 using beamforming techniques. As previously mentioned, in at least some embodiments, each data packet sent by the AP 702 may be transmitted using both beamforming and non-beamforming techniques to prevent data collisions due to timeouts on one or more of the STAs.

Figure 7C:
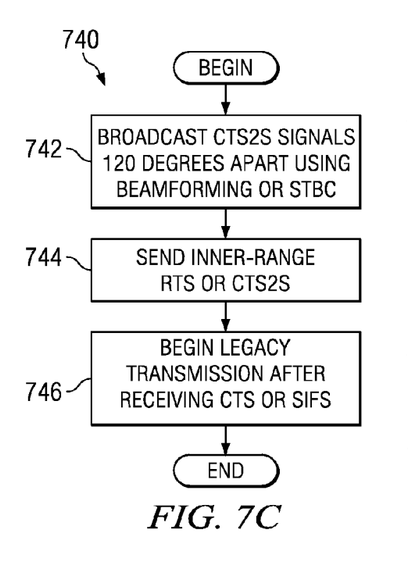

FIG. 7c shows another illustrative method 740 that may be implemented in accordance with various embodiments. Referring to FIGS. 7a and 7c, the method 740 comprises broadcasting multiple CTS2S signals (or their equivalents). These CTS2S signals preferably are directed in 3 directions, where the directions are spaced approximately 120 degrees apart. The signals actually are broadcast in all directions, but are particularly focused (i.e., intense) in those 3 directions. Other suitable transmission patterns also may be used. The signals preferably are transmitted using a long-range transmission technique (e.g., beamforming, STBC) (block 742). In this way, most or all of the STAs in the outer range 724 (e.g., STAs 714, 716, 718, 720) detect the CTS2S signals and, as a result, they at least temporarily refrain from transmitting data on the network 700. The method 740 then comprises sending an inner-range RTS signal or CTS2S signal (block 744). Thus, most or all of the STAs in the inner range 722 detect the RTS signal or CTS2S signal and, as a result, they at least temporarily refrain from transmitting data on the network 700. The method 740 further comprises beginning legacy (i.e., non-long-range) transmissions after receiving a CTS signal or short-interframe space (SIFS) signal in response to the RTS signal or CTS2S signal of block 744 (block 746).

For example, the AP 702 may transmit 3 CTS2S signals, 120 degrees apart from each other, using beamforming. The AP 702 then may send an RTS signal within the inner range 722 or, alternatively, the AP 702 may send a CTS2S signal within the inner range 722. Once a confirmation signal (e.g., a CTS confirmation signal for an RTS signal sent in block 744 or, alternatively, a SIFS confirmation signal for a CTS2S signal sent in block 744) is received, the AP 702 may begin transmission of data to a target STA (e.g., STA 716) using beamforming techniques. As previously mentioned, in at least some embodiments, each data packet sent by the AP 702 may be transmitted using both beamforming and non-beamforming techniques to prevent data collisions due to timeouts on one or more of the STAs. Thus, because the AP 702 begins transmitting beamformed signals after causing most or all of the STAs on the network 700 to refrain from transmitting data at the same time as the AP 702, data collisions due to beamforming may be remedied.

Figure 7D:
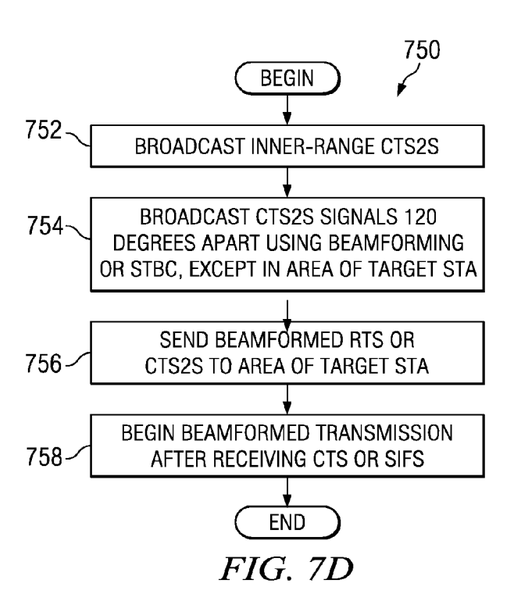

FIG. 7d shows yet another illustrative method 750 that may be implemented in accordance with various embodiments. Referring to FIGS. 7a and 7d, the method 750 comprises broadcasting a CTS2S signal or equivalent signal within the inner-range 722 (block 752). In this way, most or all STAs in the inner range 722 will at least temporarily refrain from transmitting data on the network 700. The method 750 then comprises broadcasting 3 CTS2S signals using a long-range transmission technique (e.g., beamforming) and spaced 120 degrees apart (block 754). In some embodiments, because it is not necessary for a target STA to receive one of the CTS2S signals, these 3 CTS2S signals preferably are oriented so that none of the CTS2S signals is transmitted directly to the area of the network 700 containing a target STA (e.g., STA 716). In this way, the areas of the network 700 containing STAs other than the target STA are likely to receive a clear CTS2S signal. The method 750 then comprises sending a beamformed RTS (or, in some embodiments, a CTS2S) signal to the area of the network 700 comprising the target STA (block 756). In this way, the target STA is prepared to communicate with the AP 702 and it is ensured that other STAs in the vicinity of the target STA at least temporarily refrain from transmitting data on the network 700. The method 750 further comprises initiating beamformed transmissions from the AP 702 after receiving a confirmation CTS signal (in response to an RTS of block 756) or a confirmation SIFS signal (in response to a CTS2S of block 756) (block 758). As previously mentioned, in at least some embodiments, each data packet sent by the AP 702 may be transmitted using both beamforming and non-beamforming techniques to prevent data collisions due to timeouts on one or more of the STAs.

Although the above description is provided in terms of transmissions sent from the AP 102 to the STA 108, the scope of this disclosure is not limited to any particular transmission path. The techniques disclosed herein may be applied to transmissions from any AP to any STA and/or from any STA to any AP. In some embodiments, the network 100 may comprise multiple APs which use the disclosed techniques in communicating with each other.

Figure 7E:
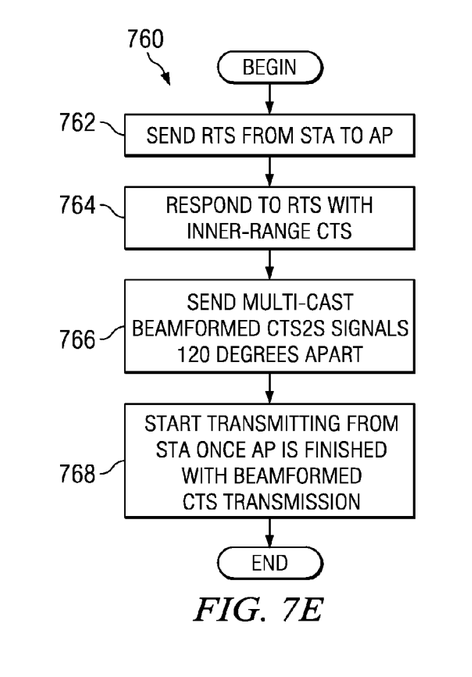

Accordingly, FIG. 7e shows yet another illustrative method 760 that may be implemented in accordance with various embodiments. Although the methods 730, 740 and 750 are primarily used for beamformed transmissions from the AP 702 to a target STA, the method 760 preferably is used for beamformed transmissions from an STA to the AP 702. The method 760 begins by sending an RTS signal from the STA to the AP 702 (block 762) to determine whether the AP 702 is prepared to receive data transmissions from the STA. The method 760 then comprises responding to the RTS by transmitting a CTS in the inner-range 722 (block 764). In this way, the AP acknowledges the RTS signal sent by the target STA and informs the target STA that the AP is prepared to receive data transmissions. The CTS signal also informs other STAs in the inner-range 722 that the network 700 is busy and that they should at least temporarily refrain from transmitting data on the network 700. The method 760 then comprises multicasting beamformed CTS2S signals (e.g., 3 beamformed signals) 120 degrees apart (block 766) so that STAs in the outer range 724 determine that the network 700 is occupied and that they should at least temporarily refrain from transmitting data on the network 700. Other suitable transmission patterns also may be used. The method 760 then comprises beginning transmission from the STA once the AP 702 is finished with the beamformed CTS2S transmissions (block 768). As previously mentioned, in at least some embodiments, each data packet sent by the AP 702 may be transmitted using both beamforming and non-beamforming techniques to prevent data collisions due to timeouts on one or more of the STAs.

Figure 7F:
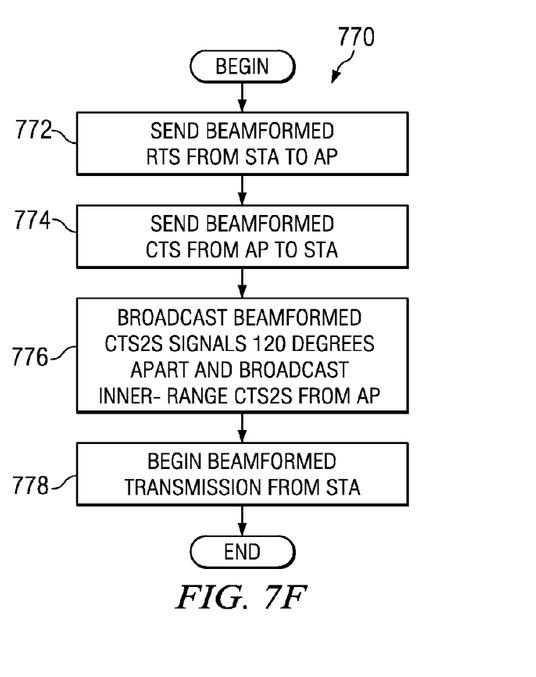

FIG. 7f shows yet another illustrative method 770 that may be implemented in accordance with various embodiments. As with the method 760 of FIG. 7e, the method 770 preferably is used for beamformed transmissions from an STA to the AP 702. The method 770 begins by sending a beamformed RTS signal from a target STA to the AP 702 (block 772) to determine whether the AP 702 is available to receive data transmissions. The signal is sent using beamforming (or another suitable technique) because the target STA is in the outer range 724. In turn, the method 770 then comprises sending a beamformed CTS from the AP 702 to the target STA (block 774) so that the target STA determines that the AP 702 is prepared to receive data transmissions and so that other STAs in the network 700 at least temporarily refrain from transmitting data on the network 700. The method 770 then comprises broadcasting beamformed CTS2S signals (e.g., 3 beamformed signals) 120 degrees apart and an inner-range CTS2S from the AP 702 (block 776). In this way, most or all STAs in the network 700 at least temporarily refrain from transmitting data on the network 700. Other suitable transmission patterns also may be used. The method 770 then comprises, after the AP 702 is finished broadcasting the CTS2S signals, beginning beamformed transmissions from the STA to the AP 702 (block 778).

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A device, comprising:
   transceiver logic; and
   control logic coupled to the transceiver logic, the control logic adapted to use the transceiver logic to broadcast a signal comprising either a Request-to-Send (RTS) signal or a Clear-to-Send-to-Self (CTS2S) signal to a plurality of other devices, the signal adapted to cause the plurality of other devices to refrain from transmitting data;
   wherein, after at least some of the plurality of other devices have received the signal, the transceiver logic transmits at least part of another signal using beamforming techniques and at least another part of said another signal using non-beamforming techniques only after receiving a Clear-to-Send (CTS) signal.

2. The device of claim 1, wherein a Media Access Control (MAC) portion of the another signal is transmitted using beamforming techniques and a preamble portion of the another signal is transmitted using both beamforming and non-beamforming techniques.

3. The device of claim 1, wherein, after at least some of the other devices have received said signal, the transceiver logic broadcasts a control frame of a third data signal using space-time block coding (STBC) techniques or low-density parity codes (LDPC) techniques.

4. The device of claim 1, wherein the device comprises a wireless communication device.

5. A device, comprising:
   transceiver logic; and
   control logic coupled to the transceiver logic, the control logic adapted to use the transceiver logic to transmit a Request-to-Send (RTS) signal to another device;
   wherein said transceiver logic begins transmitting at least part of a data signal to the another device using beamforming techniques after the transceiver logic receives one of a Clear-to-Send (CTS) signal or a beamformed Clear-to-Send-to-Self (CTS2S) signal, wherein said transceiver logic begins transmitting at least another part of said data signal to the another device using non-beamforming techniques.

6. The device of claim 5, wherein the device comprises a wireless communication device.

7. The device of claim 5, wherein a Media Access Control (MAC) portion of the data signal is transmitted using beamforming techniques and a preamble portion of the data signal is transmitted using both beamforming and non-beamforming techniques.

8. The device of claim 5, wherein at least one of said RTS signal and said CTS signal is transmitted using beamforming techniques.

9. The device of claim 5, wherein the beamformed CTS2S signal is transmitted in directions that are spaced apart by predetermined angles.

10. A device, comprising:
    transceiver logic; and
    control logic coupled to the transceiver logic, the control logic adapted to use the transceiver logic to broadcast Clear-to-Send-to-Self (CTS2S) signals to a plurality of other devices using beamforming techniques;
    wherein the transceiver logic broadcasts another CTS2S signal or a Request-to-Send (RTS) signal to a different plurality of other devices and wherein, after transmitting either said another CTS2S signal or the RTS signal, the transceiver logic transmits a first portion of data signals using non-beamforming techniques and a second portion of data signals using beamforming techniques only after receiving a Clear-to-Send (CTS) signal.

11. The device of claim 10, wherein data payload portions of said data signals are transmitted using beamforming techniques and preamble portions of the data signals are transmitted using both beamforming techniques and also using non-beamforming techniques.

12. The device of claim 10, wherein at least some of said CTS2S signals are transmitted in directions that are spaced apart by predetermined angles.

13. A system, comprising:
    a primary network member; and
    a plurality of secondary network members;
    wherein the primary network member broadcasts a signal that is adapted to cause the plurality of secondary members to refrain from transmitting data, wherein said signal is selected from the group consisting of a Clear-to-Send (CTS) signal, a Request-to-Send (RTS) signal and a Clear-to-Send-to-Self (CTS2S) signal;
    wherein, after at least some of the plurality of secondary network members have received said signal, the primary network member transmits at least part of a data signal using a long-range communication technique and another part of the data signal using non-long-range communication techniques.

14. The system of claim 13, wherein a Media Access Control (MAC) portion of the data signal is transmitted using long-range communication techniques and a preamble portion of the data signal is transmitted using both long-range communication techniques and non-long-range communication techniques.

15. The system of claim 13, wherein said long-range communication technique comprises beamforming.

16. A method, comprising:
    in a network comprising a primary member and multiple secondary members, broadcasting a signal from the primary member that causes some of the multiple secondary members to refrain from transmitting signals on the network, wherein said signal comprises a signal selected from the group consisting of Clear-to-Send (CTS) signals, Request-to-Send (RTS) signals and Clear-to-Send-to-Self (CTS2S) signals; and after at least some of the multiple secondary members have received said signal, transmitting at least part of another signal from the primary member to one of the multiple secondary members using beamforming techniques, wherein said transmitting said another signal using beamforminq techniques comprising:

transmitting a first portion of said another signal using beamforminq techniques; and transmitting a second portion of said another signal using non-beamforming techniques.

17. The method of claim 16, wherein said primary member comprises a wireless access point (AP).

18. The method of claim 16, wherein said first portion comprises a Media Access Control (MAC) portion of the another signal and said second portion comprises part of a preamble of the another signal.

19. A method, comprising:

in a network comprising a primary member and multiple secondary members, broadcasting a signal from one of the multiple secondary members that causes some of the multiple secondary members to refrain from transmitting signals on the network, wherein said signal comprises a signal selected from the group consisting of Clear-to-Send (CTS) signals, Request-to-Send (RTS) signals and Clear-to-Send-to-Self (CTS2S) signals; and after said some of the multiple secondary members have received the signal, transmitting at least part of another signal from said one of the multiple secondary members to the primary member using beamforming techniques, said transmitting at least part of said another signal using beamforming techniques comprising:

transmitting a first portion of said another signal using beamforminq techniques; and transmitting a second portion of said another signal using non-beamforming techniques.

* * * * *